United States Patent
Soldwish-Zoole et al.

(10) Patent No.: US 6,311,847 B1
(45) Date of Patent: Nov. 6, 2001

(54) METHOD AND MEANS FOR SAND REBLENDING

(75) Inventors: Trenton L. Soldwish-Zoole, Lincoln, NE (US); Franklin E. Squires, Des Moines, IA (US)

(73) Assignee: HGH Associates Ltd., Columbus, NE (US)

( * ) Notice: Subject to any disclaimer, the term of this patent is extended or adjusted under 35 U.S.C. 154(b) by 0 days.

(21) Appl. No.: 09/266,037

(22) Filed: Mar. 11, 1999

Related U.S. Application Data

(60) Provisional application No. 60/104,665, filed on Oct. 16, 1998.

(51) Int. Cl.$^7$ .............................. B03B 11/00; B03B 5/62; B07D 5/08
(52) U.S. Cl. ........................... 209/156; 209/491; 222/64; 222/644; 222/144.5
(58) Field of Search .................................. 209/454, 461, 209/464, 483, 488, 491, 156; 222/64, 644, 144.5, 30, 23

(56) References Cited

U.S. PATENT DOCUMENTS

| | | |
|---|---|---|
| 3,114,479 * | 12/1963 | Keeney . |
| 3,129,849 * | 4/1964 | Cochran . |
| 3,467,281 * | 9/1969 | Archer . |
| 3,913,788 | 10/1975 | McCauley . |
| 4,199,080 | 4/1980 | Keeney . |
| 4,428,505 * | 1/1984 | Casey et al. ............................ 222/64 |
| 4,707,249 * | 11/1987 | Apeland ................................ 209/156 |
| 4,717,470 * | 1/1988 | Apeland ................................ 209/156 |
| 5,818,732 | 10/1998 | Vanderwilt . |

* cited by examiner

*Primary Examiner*—Donald P. Walsh
*Assistant Examiner*—Daniel Schlak
(74) *Attorney, Agent, or Firm*—Zarley, McKee, Thomte, Voorhees & Sease

(57) ABSTRACT

A method of reblending aggregate includes delivering aggregate of various sizes to the classification tank having a plurality of stations with primary and secondary discharge valves. The tank is then calibrated to determine raw feed analysis, discharge rates and the flow multipliers needed to develop a mathematical model of the tank. Inputting the calibration information data and the desired production specification into a computer allows the tank to be operated and controlled with appropriate adjustments in discharge rates and valve percent settings at each station. This method provides more accurate control than the existing min-max control methods. The apparatus for this method includes the tank, a pumping device, and a computer interconnected with a PLC and electrohydraulic mechanisms for valves at each tank station such that both the discharge rate from each station and the valve percent settings of the individual valves at each station are variable and controllable.

3 Claims, 5 Drawing Sheets

Microfiche Appendix Included
(3 Microfiche, 112 Pages)

METHOD AND MEANS FOR SAND REBLENDING

CROSS-REFERENCE TO RELATED APPLICATIONS

This application claims the benefit of U.S. Provisional Application No. 60/104,665 filed Oct. 16, 1998.

REFERENCE TO A MICROFICHE APPENDIX

This disclosure includes references to a microfiche appendix containing a computer program code listing and screen display printouts collectively called Appendix A. Microfiche Appendix A includes a total of 122 frames on 3 microfiche sheets.

A portion of the disclosure of this patent document contains material which is subject to copyright protection. The copyright owner has no objection to the facsimile reproduction by anyone of the patent document or the patent disclosure, as it appears in the patent and trademark office patent files or records, but otherwise reserves all copyrights whatsoever.

BACKGROUND OF THE INVENTION

The present invention relates to aggregate processing. More particularly, this invention relates to a percentage-based computerized method and means for reblending fine aggregates, such as sand, to predetermined specifications.

Production sites in operation for decades will eventually run short of easily processable aggregate material. Many plant operators are already finding that some existing sections fail to contain sand passing their gradation specifications. Consequently, the plant operators must work around the substandard deposits or, worse yet, discard otherwise saleable material that happens to be mixed with the substandard material.

With increasing consciousness of environmental issues and expanding population areas, many producers are unable to secure additional zoning permits to continue production and must optimize their existing plants. Specifications for higher strength materials or specialty products, such as those developed by a computer, require more extensive processing methods. Producers who can consistently meet those higher demands may find these products worth several times what they are supplying now.

Fine aggregate, herein referred to as minus ⅜" (9.5 mm) or number 4 mesh, cannot be separated efficiently in large quantities with vibrating screens, unlike its counterpart coarse aggregate. A traditional sand gradation specification has several different sizes required (frequently six to eight) and is written in either cumulative percent retained or percent passing through a screen. A single screening machine that could handle even 100 tons per hour just to separate these different sizes would probably be very large and cost prohibitive for most producers.

In many cases, plant operators have been able to use large quantities of water or rising currents in a fine-material washer (sand screw) to float out up to about 50 mesh material. By doing so, saleable sand products may have been produced from reasonably good deposits. In some cases, though, consistency may suffer or the material may not meet specification due to changes in the deposit. A method for separating fractions was required.

As early as the 1950s, classification tanks were being used in the United States. Early models were not much more than long, water-filled tubs with several valves to discharge accumulated material located in the floor of the vessel. Some models had manually operated valves, while others were spring loaded. Many valving methods were very messy, difficult to maintain, or prone to excessive wear. A portion of excess material from given valves was diverted away from the rest of the tank's material, thus attempting to bring the resultant product into specification.

Today, in conventional classification tanks, rods extending from a control bridge mounted over the tank support the product valves. The valves are usually grouped into units of three, called a station or cell, and also incorporate a material level sensor to detect the availability of sand. Hydraulic cylinder pistons actuate the valve rods when the sensor trips and a tank control determines which valve opens.

In a classification tank, sand slurry is pumped into the tub and over an elevating plate at one end. The plate acts as a ramp to arc the flow through the tank. In general, heavier particles fall out of suspension from this flow while lighter particles are carried farther down the vessel. Each particle has a tendency to settle in a particular area; however, they are not immune to external influences. For example, sand slurry entering the vessel at different velocities will settle in different areas.

In most sand specifications, only a limited quantity of minus 200 mesh material (silts) can be tolerated. In most processing applications, these silts must be washed off or floated out with water at a ratio of 100 gallons per minute per ton per hour of silt. When insufficient clean water exists, the silts remain in suspension and increase the specific gravity and particles inconsistently settle. If silt dilution is not met for a long period of time, these particles will migrate down the tank and mud will eventually accumulate over and around the back end valves, thus preventing any material from existing.

A similar problem occurs with material of varying specific gravities. In hydraulic classification tanks, smaller particles travel farther, but when the particles are the same sizes, the material with a higher specific gravity will fall more quickly than its lighter companions. The same can be said for irregularly shaped or flat material such as crusher tailings. In addition, as individual grains travel down the tank, they collide with other grains, support structures or valve rods. The result could be these particles bouncing farther down the tank or decreasing in velocity and falling out of suspension sooner than expected.

It is difficult to imagine the influence of up to 500 tons per hour of collisions, material densities, surface areas, specific gravities and movement rates. In actuality, several different sizes of material settle at each station. One or two sand fractions, with a much smaller mix of other sizes, predominately comprise a sample from each valve. By examining these valve samples, a general model of a tank is seen. This gradation of the material discharged from each cell is referred to as a station analysis. Though far from perfect separation, it is reasonably consistent and is the principle basis of classification tanks today.

Given the station analysis, one has only to determine the quantities discharged over time to develop an overall picture of the tank production. The first tank controls were not much more than timers, indicator lights, and relays and served as good examples of early automation counting machines.

An operator observes how long each valve discharges material and adjusts the product split at that station to attempt to bring the product into specification. Unfortunately, this system is usually trial and error. Once the operator sets the control for given settings, he still needs to sample the final product and make adjustments to the station timers. Over time, the discharge rates change and the operator needs to adjust the control again.

Many operators set up their controls to run with very tight control and everything outside of that model is discarded. Most plants operate in this way and produce products in specification, but in some cases the waste material unnecessarily outweighs the saleable product. The need for an efficient control that could adjust itself to compensate for feed or flow changes is evident.

Therefore, a primary objective of the present invention is the provision of a method and means for an efficient, self-adjusting, flexible, closed loop computerized control system for reblending sand to a given specification.

Another objective of the present invention is the provision of a reblending control system, which utilizes programmable logic controllers connected to a computer.

Another objective of the present invention is the provision of a control system for fine aggregate reblending which controls valve opening time at each station as a percentage of the total available valve opening time at all stations.

Another objective of the present invention is the provision of a control system for fine aggregate reblending which controls valve opening time by a plurality of discharge valves at a given station as a percentage of the total available valve opening time at that particular station.

Another objective of the present invention is the provision of a control system for fine aggregate reblending which is economical to manufacture and use, is reliable in use, and provides for remote control and networking.

These and other objectives will be apparent from the drawings, as well as from the description and claims which follow.

SUMMARY OF THE INVENTION

The present invention relates to a method and means for reblending sand. The means includes a classification tank which has a plurality of stations and valves associated therewith. A computer electrically connected to a programmable logic controller (PLC) controls the valves at each station on a percentage basis.

The method of reblending aggregate includes delivering aggregate of various sizes to the classification tank having a plurality of stations with primary and secondary discharge valves. The tank is then calibrated to determine raw feed analysis, discharge rates and the flow multipliers needed to develop a mathematical model of the tank. Inputting the calibration information data and the desired production specification into a computer allows the tank to be operated and controlled with appropriate adjustments in discharge rates and valve percent settings at each station. This method provides more accurate control than the existing min-max control methods.

Inputting the data into a computer provides greater flexibility, control and accuracy. The computer and the programmable logic controllers are connected in a closed loop so that feedback can be given to the computer by the PLCs and the computer can provide command signals for opening and closing the valves. Percentage-based control allows optimization within each station and throughout the whole tank.

DETAILED DESCRIPTION OF THE PREFERRED EMBODIMENT

Figure 1:
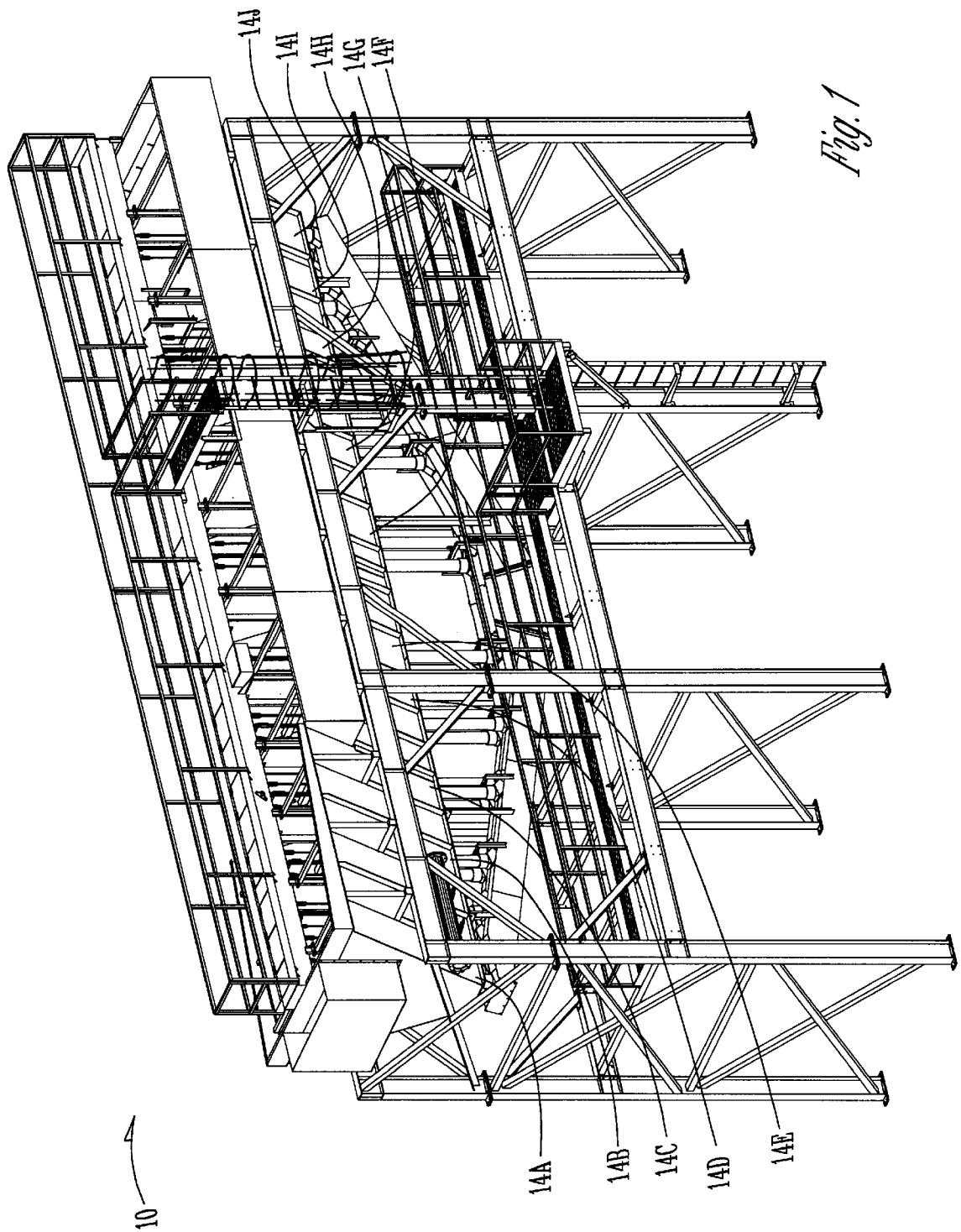
FIG. 1 is a perspective view of a classification tank adaptable to the present invention.

The hydraulic classification tank 10 shown in FIG. 1 facilitates the use of the control 12 (FIG. 4) and methods of this invention. The controls and methods of this invention utilize a personal computer to track the product discharged, perform the mathematical optimization routines, and determine new valve settings for each station 14A–J.

Control System

Figure 4:
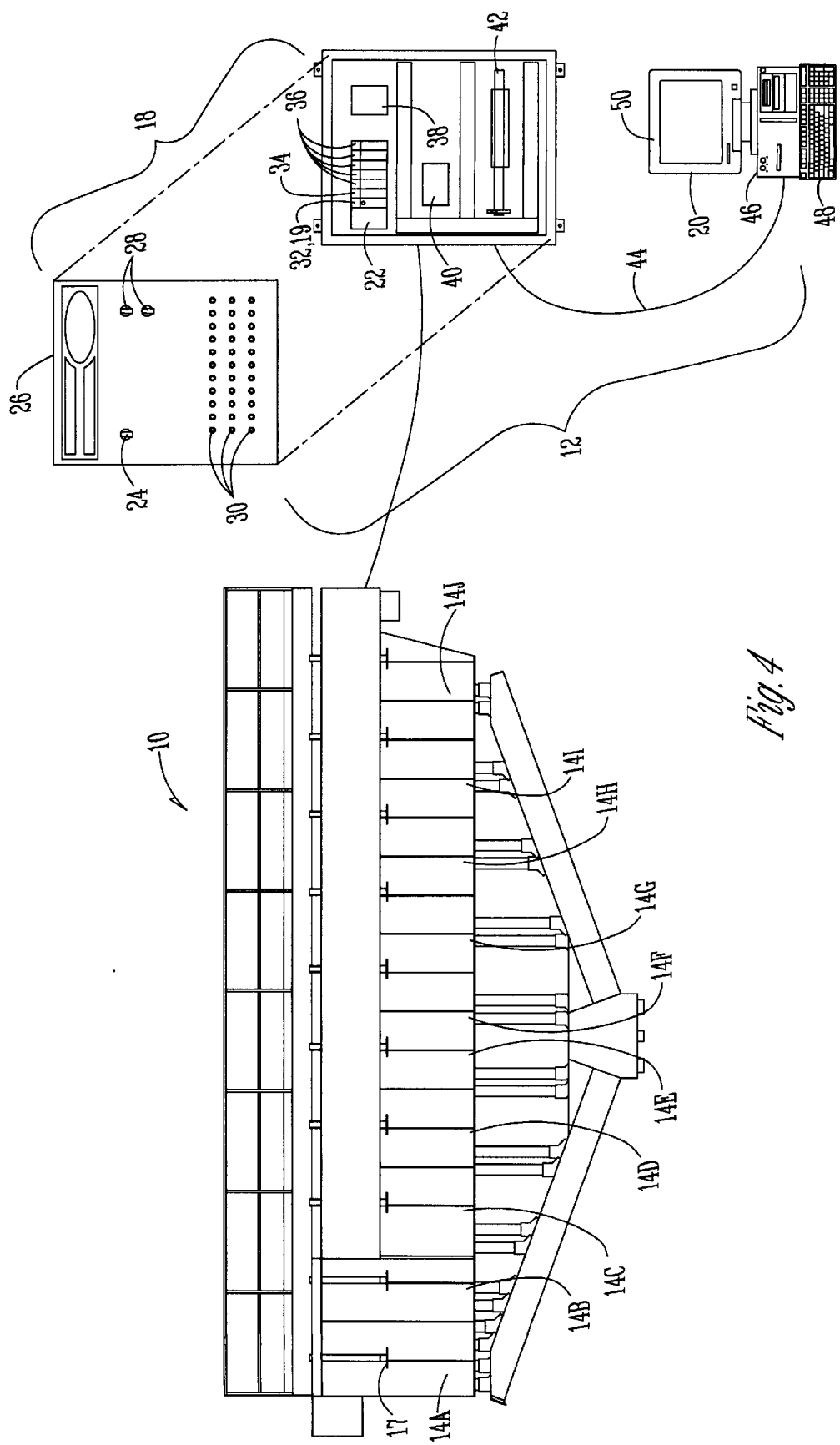
FIG. 4 is a simplified pictorial schematic diagram showing the control for reblending fine aggregate according to methods of FIG. 3.

Referring to FIG. 4, the control 12 includes a PLC 18 in communication with each station 14A–J (one PLC module may share several stations), and the PLC 18 is in communication with and controlled in a closed loop by a personal desktop computer 20. The PLC 18 includes a power supply 22 controlled by an on/off switch 24. The front cover panel 26 also has a hydraulic pump switch 28 for the valves 16A, 16B, 16C. A set of discharge indicator lights 30 on the panel 26 gives a visual indication of when the individual valves 16A, 16B, 16C at each station 14A–J are open. The PLC 18 has its own CPU (central processing unit) 32. An input module 34 in the PLC 18 receives signals from the sensors 17 at each station 14A–J, while several output modules 36 are provided in the PLC 18 for opening the valves 16A, 16B, 16C at the various stations. A power regulator 38 is also associated with the PLC 18.

The bottom portion of the PLC cabinet houses a personal computer interface module 40 and a wiring terminal block 42. The control program interfaces with an Allen-Bradley programmable logic controller (PLC) 18 so local support and components are almost always right at hand. The personal computer 20 is electrically connected to the PLC 18 by appropriate wiring 44 and has its own CPU 46, keyboard 48 for data entry, and monitor 50 for display.

Basic Tank Operation

Under normal operating conditions, the tank 10 is filled with water and slurry is pumped horizontally in one end. As the flow carries down the tank 10, particles fall out of suspension and settle to the bottom of the vessel forming a bed of material. In general, larger particles will fall before small particles. Larger particles tend to fall into the first few stations 14A–J downstream of the inlet, but particles of various sizes will likely be found at each station 14A–J.

Figure 2:
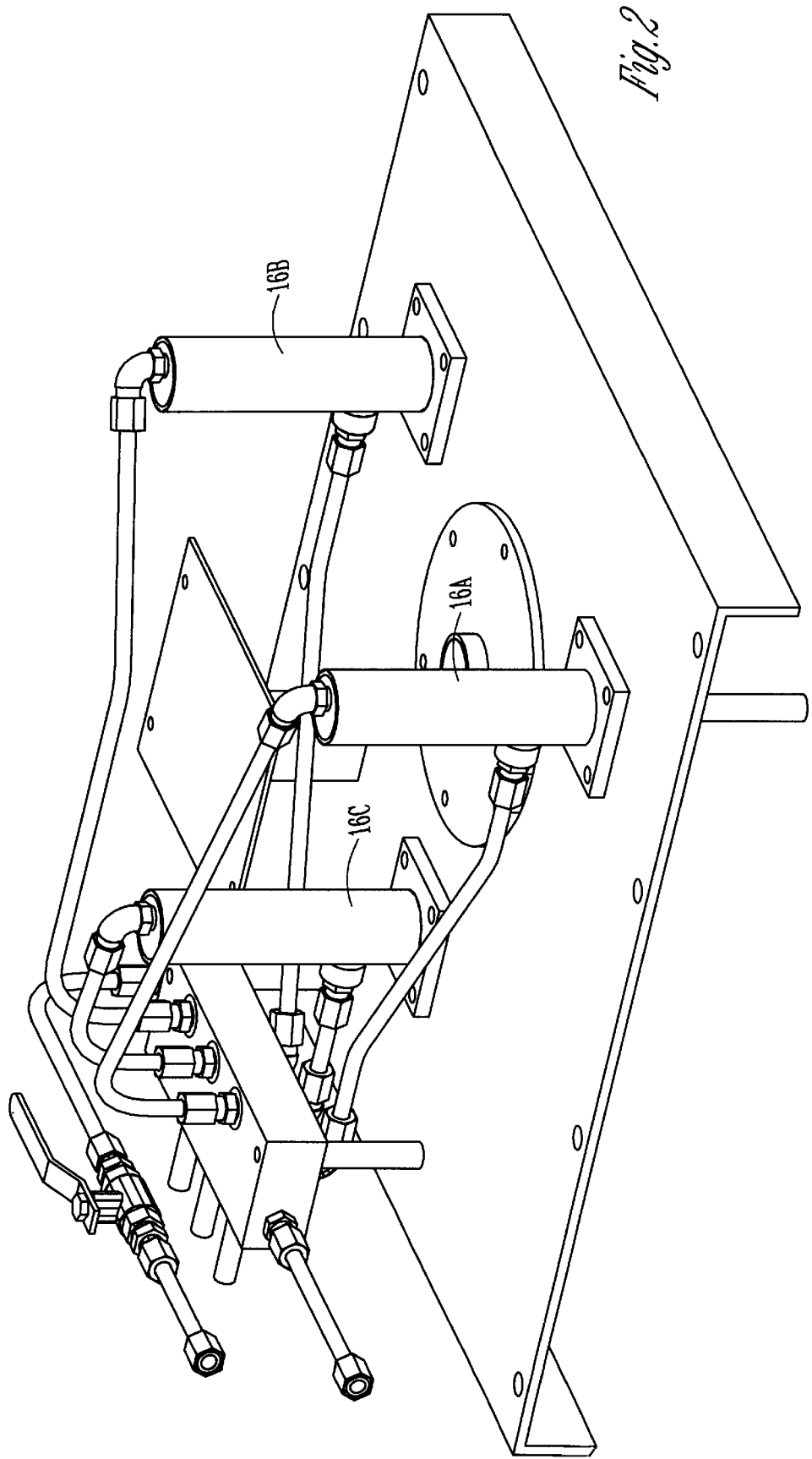
FIG. 2 is a perspective view of the valves found in the stations or cells of the classification tank of FIG. 1.

At several points through the tank 10 are collections of devices, also called stations 14A–J. As seen in FIGS. 2 and 4, each station 14A–J consists of three valves 16A, 16B, 16C and one bed level sensor 17. As the material builds up to that sensor 17, it sends a signal to the programmable logic controller (PLC) 18. The PLC 18 has been preloaded with "station settings" to control which valve 16A, 16B, 16C will open. If and only if the sensor 17 signals the existence of material will a valve open, and the selected valve 16A, 16B, 16C will open all the way. Material drains out through the selected valve 16A, 16B, 16C, and when the sensor 17 no longer detects any material, the valve 16A, 16B, 16C goes closed. This operation continues indefinitely.

Discharge Valves

The discharge valves 16A, 16B, 16C are dual action electro-hydraulic valves, which are electrically activated, coil drawn, and piston operated. When the PLC 18 provides an electrical signal to the coil of the valve 16A, 16B, 16C, the resulting magnetic force draws the piston upward in its cartridge, which allows hydraulic oil to flow through a manifold and open the valve 16A, 16B, 16C for discharge. The valves 16A, 16B, 16C are normally closed unless energized.

Station Settings

As stated above, each station 14A–J has three discharge valves 16A, 16B, 16C, also referred to as A, B, C. A is typically the primary product (such as sand for concrete); B is secondary (such as sand for masonry); and C is tertiary excess or waste which does not fall into the other categories. The station valve settings for each station add to 100% in every case. The PLC 18 stores the setting values for A, B and C, which are calculated as follows: C=100−(A+B).

The PLC 18 selects which valve 16A, 16B, 16C to open at each station (when the sensor 17 at that station is triggered) in the following manner:

1. A fifteen-second duty timer 19 (implemented through ladder logic in the CPU 32 of the PLC 18) is counting from 0 to 100 continuously.
2. Whenever the "A" setting is greater than or equal to the timer value (and the sensor 17 is triggered), open valve A.
3. Whenever the "B" setting is greater than the inverse timer value (100 minus timer) and the sensor 17 is triggered, open valve B.
4. Whenever the timer value is greater than "A" AND the inverse timer value is greater than "B" (and the sensor 17 is triggered), open valve C.

Valve Discharge Times

The PLC 18 serves two main functions: open valves 16A, 16B, 16C when the sensor 17 is triggered and record the valve discharge time. The PLC 18 stores the discharge time by counting the number of seconds each valve has been open during a set period called a cycle. To convert this data to an immediately usable form, the following procedure is used.

A ten-station tank is used in this example, but the procedure is clearly applicable to tanks utilizing other numbers of stations.

---

Station 1 Total = Sta 1 Valve A + Sta 1 Valve B + Sta 1 Valve C
Station 2 Total = Sta 2 Valve A + Sta 2 Valve B + Sta 2 Valve C
.
.
.
Station 10 Total=Sta 10 Valve A + Sta 10 Valve B + Sta 10 Valve C
Total = (Sta 1 Total + Sta 2 Total + ... + Sta 10 Total)
Sta 1 Percent = Sta 1 Total/Total
Sta 2 Percent = Sta 2 Total/Total
.
.
.
Sta 10 Percent = Sta 10 Total/Total

---

The end result is a ratio of each station's activity with respect to all the other stations. This ratio is referred to herein as the "discharge rate." An example of this is illustrated in the program printout of microfiche Appendix A under the heading "Discharge Rates." In the program printout of Appendix A, eleven stations are shown instead of ten.

The Cycle

As noted, the PLC records information during a set time called a cycle. The cycle time typically utilized in this invention is 60 to 90 seconds long. The PC 20 of the system reads the data registers of the PLC storing the discharge times at the end of each cycle, performs mathematical computations, and stores the new station settings in the proper memory locations of the PLC. This differs from other manufacturers who use a cycle time in the range of about five minutes.

Calibration Cycle

Initially the control must be calibrated for the particular tank and location. Typically a 30-minute calibration cycle is used. The control is set for 100% valve 16A at each station 14A–J. Thus, whenever the sensor 17 triggers valve 16A and only valve 16A will open and discharge material. Typically this material is segregated or stockpiled away from normal production. During this calibration period, two things happen. First, the control 12 is permanently storing all the valve discharge time, and second, the operator is taking physical samples from each station discharge.

At the close of the cycle, the operator also samples the segregated pile. All the samples must be processed before the data is available to enter into the control. Frequently a test site exists at the plant, and samples usually take about 45 to 60 minutes each to process. At most sites, for an 11-station tank with 1 stockpile sample, this takes all day. An eleven-station tank is used in the following examples for best correspondence with the sample program which is attached.

Calibration Sample Composition

In the program printout included in the microfiche Appendix A, labeled as "Calibration Analysis: Raw Sand," you will note that at each station several different sizes of material are listed. The lack of precise separation is one of the fundamental aspects of a hydraulic classification tank. On the printouts, the tank stations 14A–K are labeled from 1 to 11 with station 1 located at the feed entry point and station 11 at the location most remote from that point. The calibration analysis report is presented in terms of "percent retained" or what percent of each station consists of each size of material. The sizes of material are located on the X-axis of the grid and decrease in size from the reader's left to right. The last label or "Pan" is the smallest grain represented, sometimes referred to as "silt," and is smaller than 200-mesh sand. For comparison, finely ground flour is approximately 200-mesh material.

Calibration Mathematical Model

When all the calibration data is collated, the operator inputs it into the control 12 through the keyboard 48 or automatically through the PLC 18. The control 12 then uses the data to calculate a set of calibration multipliers. These multipliers are static and unique to each calibration. The base mathematical model (which is an 11×9 grid for this example) follows, as does a brief description of how the multipliers are calculated.

$$\text{MathModel} = \text{Calibration Analysis} * \text{Discharge Rate} * \text{Multipliers}$$

$$\text{Product} = \sum_{i=1}^{n} \text{MathModel for each size of material}$$

n=number of columns

The MathModel is fairly easy to derive since the calibration analysis (station based) and the discharge rates (also station based) are basically static. You will note, however, that the calibration analysis (for an 11-station tank) is an 11×9 grid. If you consider that the calibration pile sample is merely a 1×9 grid and the discharge rate is an 11×1 grid, we are given the opportunity to perform matrix algebra and solve for the multipliers.

Estimated MathModel=Calibration Analysis*Discharge Rate*Flow Multiplier (FM=1.0 as a default for calibration)

$$\sum_{i=1}^{n} \text{Estimated MathModel}$$

Calculate each station contribution to the sum as a percent of sieve size (by column)
Multipliers equals Pile sample divided by Percent of Sieve Size The following code example details this more clearly. Temp9 is the nine-element array of the pile sample. TankAn1 and FlowRate below refer to the calibration analysis and discharge rate respectively.

```
For Y = 1 To 9
  T = 0
  For X = 1 To 11
    MathModel (X, Y) = TankAn1 (X,Y) * FlowRate (X)/100
    T = T + MathModel (X, Y)
  Next X
  Multipliers (Y) = T
  Multipliers here used only as placeholder array
  YT = YT + T
Next Y
For Y = 1 To 9
  Multipliers (Y) = Multipliers (Y)/YT * 100
    Multipliers here used only as placeholder array
Next Y
For Y = 1 To 9
  If Multipliers (Y) <> 0 Then
    Multipliers (Y) = Int(Temp9
(Y)/Multipliers (Y) *1000+0.5)/1000
  Else
    Multipliers (Y) = 1
  End If
Next Y
```

Essentially, the above calculations provide flow multiplier estimates that reconcile the math model with the actual results as found in the calibration stockpile. As a result, the control 12 develops a mathematical model of the tank 10. This information can then be generalized to predict the discharged product for different subsequent valve discharge rates. As the discharge rates naturally vary during the production run, the control 12 uses the mathematical model developed in calibration to recalculate the feed gradation with the new discharge rates.

In some applications, multiple sets of calibration data are collected. Calibration sets could represent a different excavation area, or different dredging section. Each calibration set has its own distinct set of discharge rates developed during the calibration period. All these sets of calibration data can be stored by the control 12 (including the computer 20) and recalled for later use. In some cases, the control 12 may be set up to automatically change to another existing set of calibration data when it reads a similar pattern of discharge rates. Since these changing discharge rates represent changes in the final product of the tank 10 another method is to periodically sample the product stockpile and return the results to the control 12. The control 12 may read these actual samples and automatically switch to another calibration set to more closely correlate its theoretical and actual production. If only to verify automation, most top-notch quality assurance agendas already include sampling products on a regular basis.

Production Operation

Figure 3:
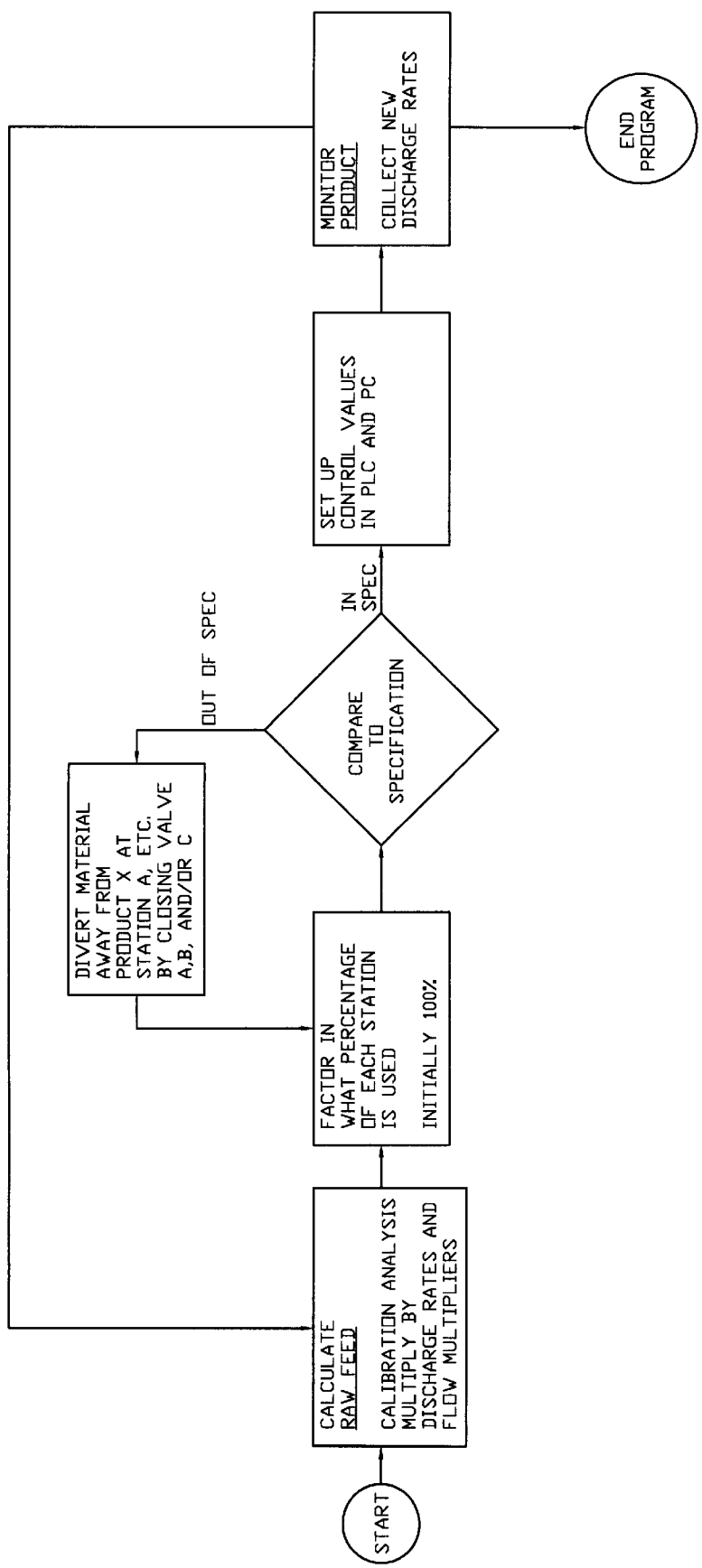
FIG. 3 is a flow diagram showing the fine aggregate reblending method of the present invention.

Once the control 12 is calibrated, the operator can enter the specifications of the products (primary and secondary) which the tank 10 is to produce and swing the product conveyor back to a production position. The control 12 and methods of this invention are particularly suited to classification tanks 10 that utilize a plurality of stations 14A–J having three valves 16A, 16B, 16C. As seen in FIG. 3, the production operation of the tank 10 really starts with the inputs from calibration. The control 12 calculates the raw feed based on the calibration analysis multiplied by the discharge rates and the flow multipliers. The station analysis is also factored in so that the information is specific to each valve 16A, 16B, 16C in each station 14A–J of the tank 10. Initially, the discharge rate or percentage of each station used is 100%.

The raw feed data is then compared to the specification in the computer 20. If the tank 10 is producing out of specification for the primary product, for instance, the control 12 determines which sieve size is farthest out of specification and determines which station has the most of that particular sieve size. The computer 20 merely searches the MathModel for the largest value in the column corresponding to that (sieve) size. Then the computer 20 and one of the PLCs 18 diverts material at that station 14A–J by diverting material away from the primary discharge valve 16A to other valves 16B or 16C within that station. In other words, by closing the valve 16A, thus reducing the discharge rate of that station 14A–J relative to the primary product, the output is moved closer to the specification. The valve percent settings also change accordingly.

For example, the first three stations 14A–C are initially set at 100% discharge rate. The calibration analysis shows that station 14A has the most primary product of any of the stations. The computer 20 notices an excess of primary product versus the specification and therefore signals the PLC 18 for station 14A to close the primary discharge valve, perhaps to 95%, thereby diverting some of the flow to the secondary or tertiary valves 16B,16C.

This loop continues through the various stations 14A–J until the specification is met. Then, new control values for the valves 16A, 16B, 16C are set up in the PLCs 18 and the PC 20. These control values assist in the continued monitoring of the product. New discharge rates are collected by the PLCs 18. These new discharge rates provide a feedback basis for recalculating the incoming raw feed. The process can continue indefinitely in this manner until shutdown. At that time, either the desired quantity of product has been blended to the specification or the raw material supply at the present location has been exhausted.

While the classification tank valves 16A, 16B, 16C discharge material, the control 12 will record through the PLC 18 how long each valve 16A, 16B, 16C is open and use this set of discharge rates to recalculate its incoming feed. The control 12 considers deviations from its specification, recalculates needed material diversions at the respective stations, determines new control settings, and the cycle continues as shown in FIG. 3. Going through the whole tank 10, the control 12 calculates the optimum opening/closing times of the valves 16A, 16B, 16C for each station 14A–J to discharge the material necessary to form a product within specification. The control 12 calculates what percentage of each station is needed to produce the specification material and the appropriate corresponding percent valve settings.

The percentage of valve opening/closing time can be precisely varied in each station through a percentage discharge rate and a percent valve setting. The blending of the sand is done on a percentage basis, not on a timer/batch and minimum/maximum basis like prior devices and methods. Such existing methods have limited flexibility in varying the discharge to other stations and/or valves once one or more of the valves reaches its maximum permissible value.

While the focus of this description has been mainly on the primary product, it should be remembered that the computer 20 also optimizes the output of the tank 10 relative to the secondary product in the same manner.

While all these mathematical calculations are being performed, the control 12 is operating a classification tank 10 that is producing several hundred tons per day of material. During all of that time, the control 12 is monitoring station activity and valve discharge. With all of this data being collected, it is but a short step to data reporting. Early computerized controls logged data to a difficult to manipulate plain text file, but with up-to-date computer software standards, it makes more sense to record data using a spreadsheet or database program such EXCEL™ which runs with Windows® 95 on a PC 20 (desktop personal computer).

Figure 5:
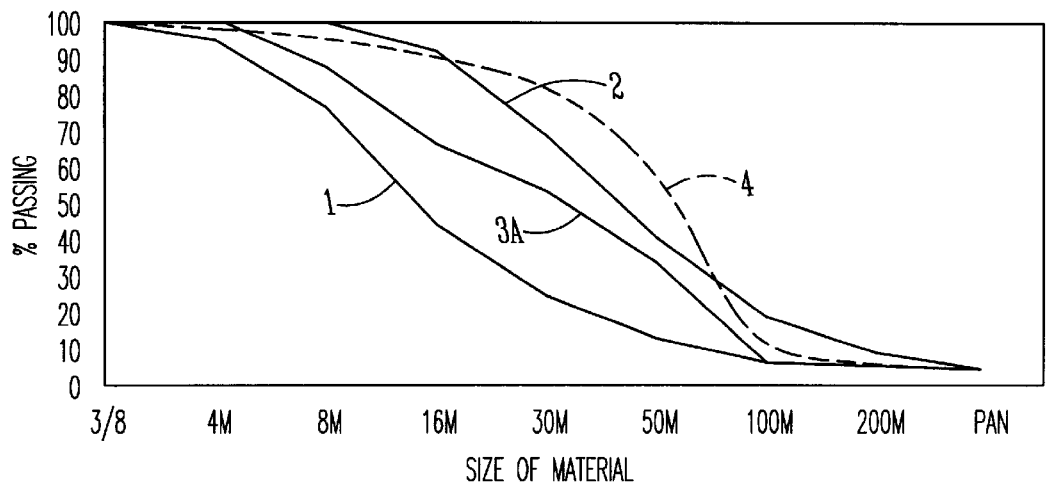
FIG. 5 is a simplified graphical representation of the main operational screen from the computer, thus illustrating the graphical capabilities of the control of this invention.
Figure 6:
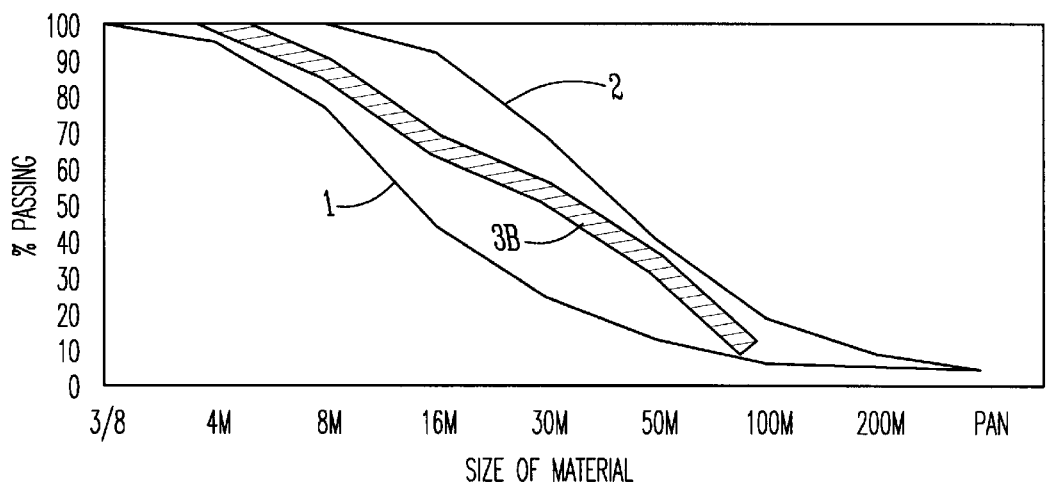
FIG. 6 is a simplified graphical representation similar to FIG. 5 but illustrates the results which would occur if a prior art control were used.

Plots of the actual feed data can easily be generated for process monitoring purposes. In FIG. 5, the production specification calls for lower and upper limits 1, 2 in terms of percent passing for each size of material. The control 12 yields a control line 3A based upon the calculated raw feed 4. With accurate production records, plant management can observe trends and predict potential sales. FIG. 6 shows a plot which might be expected from a prior art control and method. Note that while the control line 3B in FIG. 6 is a broad band, the present invention in FIG. 5 provides a relatively sharp, thin line. The thinner line 3A represents the greater accuracy and better material utilization of the present method. Notice that the raw feed line in FIG. 5 is generally above the output line 3A. This indicates that the control 12 diverts material at the various stations to meet the specification. However, one advantage of the control 12 of this invention is that it is not rigidly limited to adjustments between minimum and maximum values at certain stations. Instead, the present invention automatically chooses, from the whole tank, the station which can impact the product the most for the sieve size that is out of specification. This invention eliminates the wasteful and hertofore unnecessary calculation and use of min./max. values for control purposes.

In addition to gathering data for production reports, the classification tank controls 12 of this invention can monitor station activity for problems that may occur. These frequently aren't much more than hydraulic clogs or oversized material catching in the valve. But when the control 12 can catch them and alert the operator, preventive maintenance can be performed and costly downtime avoided. In addition to monitoring potential problems with the tank 10, this method of fault detection can also be applied to recognizing and recording problems with the tank control itself. Most modern PLCs 18 frequently have some type of analysis or debugging tool accompanying them to report errors that occur. These results can be logged for troubleshooting to minimize downtime.

Since many PLC manufacturers are marketing their own PC-based man-to-machine interfaces for industrial automation, the classification tank controls 12 of this invention fit easily into a suite of components for a well-connected plant. By using the computer networks already in place in many plants and networking a control's host computer on a modern Windows® 95, NT, or subsequent generation platform, plant operators can call up the host software and remotely monitor the control or retrieve production data.

The future is wide open for what such classification tank controls may be capable of. Utilizing current operating systems, controls 12 may opt to circumvent PLC interfaces and incorporate hardened industrial IO modules and PC cards. These potential new designs may allow the higher speed computer the ability to accept data from a variety of input devices. Production tracking and accuracy of controls may increase when aided by sensors such as belt scales, density meters or flow meters. More advanced techniques, such as optical sizing, are contemplated once they become cost effective enough to develop an up-to-the-second picture of the discharge gradation from each valve.

With today's ever tightening specification requirements such as "Superpave" materials, combined with a scarcity of "good deposits," the new Windows® 95 based Aggre-Spec III® automated sand classification tank control 12 of this invention allows operators to take full advantage of today's computing power in their specification sand operation.

The first of its kind, the Aggre-Spec III® control program multitasks with other Windows® programs to enable data logging, trending, and reporting in a user-friendly environment. With advanced recording techniques, an operator can detect potential problems before they can cause costly downtime.

Although a wet or sand slurry process has been shown and described, the present invention is also adaptable to a dry process. The process of this invention is adaptable to classification tanks with a plurality of stations. Ten or eleven station tanks have been described, but fewer or additional stations are possible, especially with computerized control. Eight to eleven stations can be accommodated in tanks from 20 feet to about 48 feet long.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention.

What is claimed is:

1. A method of reblending a mixture of aggregates from a given location comprising:

1) providing a classification tank having an inlet and a plurality of stations $S_i$, where i=1 to N, arranged at operatively progressively greater distances from the inlet to receive a raw feed input slurry comprising fluid and a mixture of aggregates of a plurality of mesh sizes M;

2) providing at each station $S_i$ a bed level sensor and a plurality of discharge valves made active only when the bed level sensor indicates that the mixture of aggregates has filled the station $S_i$ to a desired level, the plurality of discharge valves including at least a primary product discharge valve and a waste valve;

3) providing a computer connected to a programmable logic controller that is in turn connected to the bed level sensors and the discharge valves for automated control of the classification tank, the programmable logic controller setting open times on a percentage basis for each of the discharge valves within each of the stations in the tank based on input from the computer and recording and relaying to the computer the actual valve open times for each of the discharge valves;

4) inputting into the computer an initial data set for startup including an initial M×N Station Analysis matrix and initial discharge flow rates;
5) delivering the input slurry to the classification tank for a calibration run;
6) calibrating the tank by setting the primary product discharge valve at each station open 100% of a calibration cycle time, running the tank for the calibration cycle time, sampling and sieve testing the aggregate from the given location to determine raw feed input, sampling and sieve testing the aggregate discharged at each station $S_i$ by the tank, and developing a Calibrated M×N Station Analysis Matrix of actual tank performance in terms of individual percent retained for each mesh size $X_j$ at each station $S_i$, then
7) inputting data from the previous step into the computer and, by using the assumption that the raw feed input must be equal to the output discharged from the tank, calculating a 1×N matrix of discharge flow rate multipliers stated in terms of total valve open time at each station over the total valve open times at all of the stations so as to satisfy said assumption;
8) using the flow rate multipliers from the previous step, calculating in the computer a mathematical matrix model MathModelXY including an initial Product A array, the initial Product A array=Calibrated M×N Station Analysis Matrix×Matrix of Flow Multipliers;
9) inputting into the computer production specifications for a primary product, the production specifications for the primary product including a desired total quantity of the primary product to be discharged, a series of integers 1 to M designating a corresponding series of sieves $X_j$, where j=1 to M, having progressively smaller mesh sizes, and for each of the sieves or mesh sizes $X_j$ respectively a desired specification range for the percent of the discharged aggregate capable of passing through said sieve;
10) simulating operating the tank in a production mode for a given cycle time;
11) comparing the raw feed input to the specifications for the primary product and calculating with the computer a variance from the desired range of percent passing for each mesh size $X_j$;
12) if all the variances are zero, sending a signal to the programmable logic controller to set the primary discharge valve at each station $S_i$ of the tank open 100% of the cycle time and skipping to step 15;
13) if any of the variances is nonzero,
  a) determining which of the variances is largest and which mesh or sieve size $X_j$ is associated with the largest variance;
  b) establishing in the computer a simulation goal of reducing said largest variance;
  c) beginning with station 1, simulating setting the primary product discharge valve to 0% at one of the stations $S_i$ at a time and calculating a simulated Product A array with said one of the stations excluded;
  e) ceasing the previous step at a station $S_n$ which first reduces the largest variance;
  f) using the Calibrated Station Analysis Matrix from the most recent calibration step, searching in ascending numerical order from station $S_n$ to $S_N$ and identifying a station $X_e$ with the highest percent retained for the mesh size $X_{j+1}$;
  g) simulating setting the primary product discharge valve to be open a lower percentage of the cycle time at station $X_e$ to form a 1×N Usage Matrix;
  h) calculating a revised Product A array=Usage Matrix×Calibrated Station Analysis Matrix;
  i) calculating a resultant gradation including percent passing values for each mesh size;
  j) comparing the resultant gradation simulated in the previous step to the specifications for the primary product, Product A;
  k) calculating the variances from the desired range of percent passing for each mesh size $X_j$;
  l) repeating steps a)–k) and simulating reducing open times or excluding additional stations $X_e$ from anywhere in the tank as dictated by steps a)–j) to bring the simulated resultant gradation of the primary product, Product A, into the specification range for all of the mesh sizes;
14) if Product A can be produced in the specification range for all of the mesh sizes, sending a signal from the computer through the programmable logic controller to the primary discharge valve at each station $S_i$ to establish primary discharge valve settings for a production cycle based upon the above simulations and calculations;
15) running the tank in a production mode for the production cycle;
16) during the production cycle, monitoring and recording the actual open times of the primary discharge valves with the programmable logic controller and relaying said actual open times to the computer, and then
17) recalculating the flow discharge rates, the raw feed input, and the variances based upon the actual open times in order to make any valve setting adjustments necessary before a next production cycle begins.

2. The method of claim 1 including the steps of:
providing a secondary product discharge valve and a waste discharge valve in each station of the tank so as to produce a secondary product once the primary product can be produced within the specifications for the primary product;
developing a Product B Calibrated Station Analysis Matrix and a MathModelXY that includes an initial Product B array corresponding to the secondary product and wherein the specifications include a desired total quantity of secondary aggregate product to be discharged and for each of the sieves or mesh sizes $X_j$ respectively a desired specification range for the percent of the discharged secondary product aggregate capable of passing through said sieve; then
comparing a simulated resultant gradation of the secondary product to the specifications for the secondary product and calculating with the computer a variance from the desired range of percent passing for each mesh size $X_j$;
if any of the variances related to the secondary product are nonzero, repeating steps 13a–13k and 14–17 with respect to the secondary product and the secondary product discharge valves so as to keep the secondary product within its specifications.

3. A method of reblending a mixture of aggregates drawn from a given location, comprising:
providing a classification tank with a plurality of stations to receive a raw feed input slurry comprising fluid and a mixture of aggregates of a plurality of mesh sizes, each station having at least a primary product discharge valve and a waste product discharge valve;
providing a computer connected to a programmable logic controller or PLC that is in turn connected to the primary product discharge valve, the waste product discharge valve, and a bed level sensor at each station which must be tripped for the primary product discharge valve and waste discharge valve to be opened;

inputting into the computer an initial data set for startup including an initial Station Analysis matrix and initial discharge flow rates;

calibrating the tank and computer for the given location by setting the primary product discharge valve at each station open 100%, delivering the input slurry to the tank, running the tank for a given calibration cycle time, sampling and sieve testing aggregate from the given location to approximate the distribution of mesh sizes contained in the input slurry, sampling and sieve testing aggregate discharged by the tank at each station respectively, and inputting the test results into the computer so as to develop a mathematical model of the tank including an initial Product A array, a Calibrated Station Analysis Matrix of actual tank performance in terms of individual percent retained for each mesh size at each station, and a matrix of discharge flow rate multipliers that reconciles the input slurry with the sampled aggregate discharged by the tank during calibration;

inputting into the computer predetermined content specifications for a primary product including high and low percentages of aggregates capable of passing through a given series of progressively smaller mesh sizes;

simulating in the computer that the tank has been run in a production mode for a given cycle time;

comparing the simulated output gradation of the tank with the predetermined content specifications and identifying any variances therefrom;

determining which of the variances are the greatest and which of the mesh sizes is associated therewith;

progressively and sequentially searching through each station in the Product A array to identify a marker station that would first reduce said greatest variance if the primary product discharge valve associated with the station were closed such that said valve would be open 0% of the given cycle time;

searching the Calibrated Station Analysis Matrix, beginning at the marker station and continuing through all subsequent stations to find a station having the highest percent retained value for the next smaller mesh size than the mesh size with the greatest variance;

simulating setting the primary product discharge valve to be open a lower percentage of the given cycle time at the station having the highest percent retained value from the previous step;

calculating a revised Product A Matrix and replacing the raw input feed with a projected resultant gradation output by the tank based upon the previous step;

repeating the foregoing simulation and searching steps for any other mesh sizes which exhibit nonzero variance values, so that all variations from the content specifications have been considered and eliminated if possible;

establishing target percent open time settings for the primary product discharge valves at each station for a production cycle based upon the above simulations and calculations;

running the tank in a production mode for a production cycle time using the target percent open settings for the valves as determined by the most recent computer simulations and calculations;

monitoring and recording the actual open times of the primary product discharge valves allowed by the bed level sensors during the production cycle time and relaying said information to the computer;

recalculating the flow discharge rates, the raw feed input, and the variances based upon the actual valve open times recorded; and repeating the foregoing steps before a next production cycle as needed to keep the resultant gradation of the primary product in compliance with the predetermined content specifications.

* * * * *